United States Patent [19]

Troutman et al.

[11] Patent Number: 4,974,925
[45] Date of Patent: Dec. 4, 1990

[54] SPLICE CASING ASSEMBLY

[75] Inventors: Timmy D. Troutman, Jersey Shore; Barry J. Opdahl; Arnold E. Gee, both of Williamsport, all of Pa.

[73] Assignee: GTE Products Corporation, Stamford, Conn.

[21] Appl. No.: 474,577

[22] Filed: Feb. 2, 1990

[51] Int. Cl.[5] .............................................. G02B 6/36
[52] U.S. Cl. ................................................. 350/96.20
[58] Field of Search ............... 350/96.20, 96.21, 96.22, 350/96.23

[56] References Cited

U.S. PATENT DOCUMENTS

| | | | |
|---|---|---|---|
| 4,217,028 | 8/1980 | Reh et al. | 350/96.20 |
| 4,332,435 | 6/1982 | Post | 350/96.20 |
| 4,359,262 | 11/1982 | dolan | 350/96.20 |
| 4,512,628 | 4/1985 | Anderton | 350/96.20 |
| 4,556,281 | 12/1985 | Anderton | 350/96.20 |
| 4,679,896 | 7/1987 | Krafcik et al. | 350/96.20 |
| 4,744,622 | 5/1988 | Cherry et al. | 350/96.20 |
| 4,838,640 | 6/1989 | Anderton | 350/96.20 |
| 4,913,512 | 4/1990 | Anderton | 350/96.20 |

*Primary Examiner*—John D. Lee
*Attorney, Agent, or Firm*—William H. McNeill

[57] ABSTRACT

A splice casing assembly for splicing together lengths of fiber optic cable wherein respective ends of individual glass fibers are spliced together by a splicing member which is attached to an elongated support bar which has an end block fastened to either end thereof to which respective strength members are fastened by being guided around respective end blocks in an axial direction and tied in a knot. Respective knots are held in place by set screws which are axially threaded into respective end blocks. The entire assembly is enclosed in a tubular housing.

12 Claims, 3 Drawing Sheets

SPLICE CASING ASSEMBLY

BACKGROUND OF THE INVENTION

1. Field of the Invention

The present invention relates to a splice casing assembly for splicing a first length of fiber optic cable to a second length of fiber optic cable, and for providing strain relief to tensile loads applied axially along the cable. The splice casing assembly is particularly useful with low fiber count cable.

2. Description of the Prior Art

The use of optical fiber waveguides to transmit light energy is quite diverse. For example, there are telecommunication, data, Local Area Network (LAN), and military applications, to name some of the present day uses. In such applications it is not uncommon to require the coupling of fibers in end-to-end relationship. To this end, optical splices are used. For example, optical splices are used to join optical fiber lengths which are individually too short. Similarly, such splices are used during restorations to quickly and easily repair fiber breaks. However, such coupling of fibers is a source of light or signal loss. Any axial misalignment presents a particularly serious problem in signal loss. Other factors causing signal loss include angular misalignment of fibers, axial separation of adjacent fiber ends and reflections or refraction of fiber ends.

In coupling optical fiber lengths it is desirable to have a splice which can be readily used in the field, can be depended upon to properly align the constituent fibers, serves to protect the spliced area from environment factors, and secures the splice in place for any length of time. U.S. Pat. Nos. 4,512,628 and 4,556,281 to Anderton and assigned to the assignee of the present invention provide respective known splice casing assemblies of the type contemplated herein. The present invention is an improvement over the splice casings of these two patents, the splice casing assembly described and claimed herein believed to provide expanded capabilities, improved performance and enhanced user friendliness.

In considering the prior art represented by the U.S. Pat. Nos. 4,512,628 and 4,556,281 patents, typically the strength members and/or the fibers are threaded through a casing plug. This is a time consuming procedure. It is desirable to provide a corresponding casing plug around which the strength members and fibers can be guided rather than inserted therethrough, thereby easing assembly. A further reason for desiring such guiding is that a slight excess in fiber length can be introduced during assembly. This additional length can be large enough to endure small tensile loads, and small enough so as not to induce microbending, without loss of power through the splice.

Similarly, in prior art structures, the strength members of the fiber optic cable have been tied in such a manner as to be off the axis of the cable, and individual strands of the strength members have been subjected to preferential stress. It is desirable that the strength members be tied in an orientation completely axial with the cable and therefore entirely on the line of stress so that the full amount of the strength members will be pulled in tensile conditions thereby taking advantage of the total tensile strength of the cable. It is also desirable that the individual strands which comprise the strength members not be preferentially stressed.

It is also desired to provide a splice casing assembly which will direct the fibers and strength members such that they are not forced around sharp corners or positioned in a manner likely to cause fraying of the strength members or microbending of the fibers.

SUMMARY OF THE INVENTION

This invention achieves these and other results by providing a splice casing assembly for splicing a first length of fiber optic cable to a second length of fiber optic cable. The assembly includes an elongated support bar which extends along a longitudinal axis and has a first tongue extending from a first end and a second tongue extending from an opposite second end. Means are provided in association with the elongated support bar and positioned between the first end and the opposite second end for splicing together individual glass fibers extending from the first length of fiber optic cable and the second length of fiber optic cable. First means is coupled to the first end of the elongated support bar for securing in place first strength members of the first length of fiber optic cable. The first means includes a first end block which extends along the longitudinal axis from a first end block extremity which is adjacent the first end of the elongated support bar to an opposite first end block extremity and comprises a first transverse groove which extends in a direction transverse to the longitudinal axis at the first end block extremity. The first tongue fits into the first transverse groove.

A second means is coupled to the second end of the elongated support bar for securing in place second strength members of the second length of fiber optic cable. The second means includes a second end block which extends along the longitudinal axis from a second end block extremity which is adjacent the second end of the elongated support bar to an opposite second end block extremity and comprises a second transverse groove which extends in a direction transverse to the longitudinal axis at the second end block extremity. The second tongue fits into the second transverse groove.

An elongated member is provided having an internal cavity extending therethrough from one extremity to an opposite extremity for housing the elongated support bar, the first means and the second means. Means is associated with the one extremity for enclosing the cavity at the one extremity and securing in place the first length of fiber optic cable. Means is also provided associated with the opposite extremity for enclosing the cavity at the opposite extremity and securing in place the second length of fiber optic cable.

DESCRIPTION OF THE PREFERRED EMBODIMENT

Figure 1:
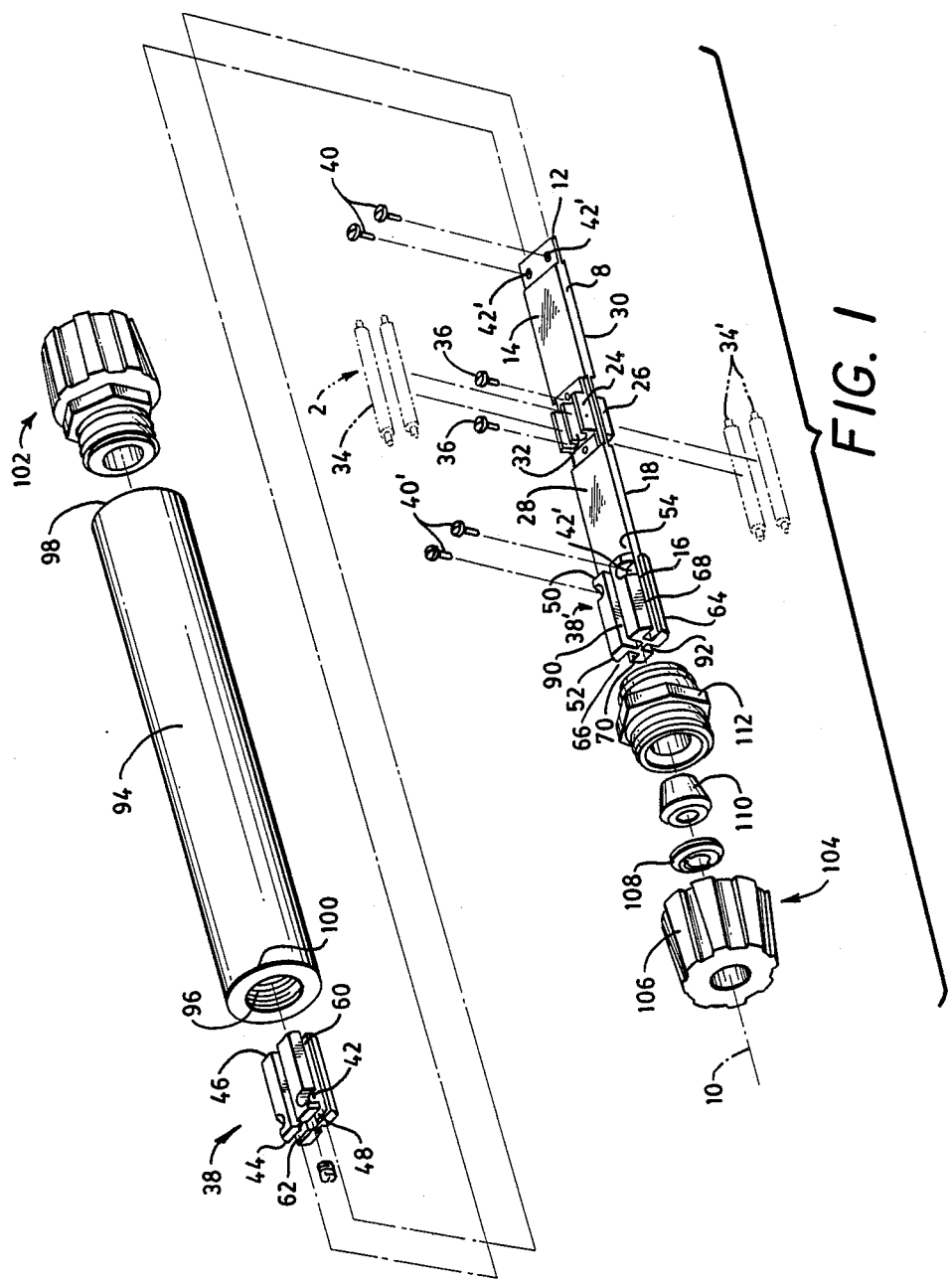
FIG. 1 is an exploded perspective view of one embodiment of the present invention without any lengths of fiber optic cable.

The embodiment of this invention which is illustrated in FIGS. 1 to 6 is particularly suited for achieving the objects of this invention. FIGS. 1 to 6 depict a splice casing assembly 2 for splicing a first length of fiber optic cable 4 to a second length of fiber optic cable 6. The splice casing assembly 2 includes an elongated support bar 8 which extends along a longitudinal axis 10. The elongated support bar 8 includes a first tongue 12 extending from a first end 14 and a second tongue 16 extending from an opposite second end 18.

Means is provided associated with the elongated support bar 8 and positioned between the first end 14 and opposite second end 18 for splicing together individual glass fibers 20 and 22 extending from the first length of fiber optic cable 4 and the second length of fiber optic cable 6, respectively. For example, in the preferred embodiment such splicing means includes at least one splice clip extending outwardly from at least one surface of the elongated support bar 8. In the embodiment of FIGS. 1 to 6 two splice clips 24 and 26 extend outwardly from respective surfaces 28 and 30. Clips 24 and 26 are known in the art and will not be described in detail herein except to note that each clip includes a plurality of opposing surfaces spring-biased relative to each other and forming generally U-shaped recesses 32 which hold in place a splicing device used to splice together respective pairs 20, 22 of glass fibers in a known manner. For example, in the preferred embodiment of the present invention the splicing means also includes at least one splicing device for splicing together the individual glass fibers. In the embodiment of FIGS. 1 to 6, two upper splicing devices 34 and two lower splicing devices 34' are provided to splice together respective pairs 20, 22 of glass fibers in a known manner. Subsequent to the splicing operation, each splicing device 34, 34' is snapped into a respective U-shaped recess 32 which holds the splicing devices in place relative to the elongated support bar 8. The clips 24 and 26 are held in place relative to the elongated support bar 8 by means of rivets 36.

The splice casing assembly 2 of the present invention also includes first means coupled to the first end of the elongated support bar for securing in place a length of first strength members of the first length of fiber optic cable 4. For example, in the embodiment of FIGS. 1 to 6, such first means includes a first end block 38 which is coupled to the first end 14 of the elongated support bar 8 by means of screws 40 which extend through apertures 42 in the end block into corresponding threaded apertures 42' in the tongue 12 of the elongated support bar. The first end block 38 extends along longitudinal axis 10 from a first end block extemity 44 which is adjacent the first end 14 of the elongated support bar 8 to an opposite first end block extemity 46. The first end block 38 comprises a first transverse groove 48 which extends in a direction transverse to the longitudinal axis 10 at the first end block extremity 44. As depicted in the drawings, the first tongue 12 fits into the first transverse groove 48.

The splice casing assembly 2 also includes a second means coupled to the second end of the elongated support bar for securing in place a length of second strength members of the second length of fiber optic cable 4. For example, in the embodiment of FIGS. 1 to 6, such second means includes a second end block 38' which is identical to the first end block 38, end block 38' being coupled to the second end 18 of the elongated support bar 8 by means of screws 40' which extend through apertures 42' in the end block into corresponding threaded apertures (not shown) in the tongue 16 of the elongated support bar. End block 38' extends along longitudinal axis 10 from a second end block extremity 50 which is adjacent the second end 18 of the elongated support bar to an opposite second end block extremity 52. The second end block 38' comprises a second transverse groove 54 which extends in a direction transverse to the longitudinal axis 10 at the second end block extremity 50. As depicted in the drawings, the second tongue 16 fits into the second transverse groove 54.

In the preferred embodiment the first end block 38 includes a pair of first opposing side surfaces 56 and 58 each of which includes a respective first strength member guiding groove 60 and 62 which extends in the direction of longitudinal axis 10 along a respective first side surface 56 and 58. As depicted in the drawings, the first transverse groove 48 extends from groove 56 to groove 58. In a like manner, the second end block 38' includes a pair of second opposing surfaces 64 and 66 each of which includes a respective second strength member guiding groove 68 and 70 which extends in the direction of axis 10 along a respective second side surface 66 and 68. As is the case regarding the first transverse groove 48, the second transverse groove 54 extends from groove 68 to groove 70.

The first end block 38 and second end block 38' each include a respective internally threaded area into which is screwed a corresponding set screw. Since each threaded area and set screw is identical, the following discussion is directed to first end block 38, it being understood that similar structure is provided for second end block 38'. In particular, first end block 38 includes a first internally threaded area 72 extending along the longitudinal axis 10, the threads being provided at opposing walls 74 and 76 of the first transverse groove 48 and extending towards the base 78 of the first transverse groove. A first set screw 80 is screwed into the threaded area 72 towards base 78. As noted, second end block 38' includes a corresponding second internally threaded area and second set screw.

In the preferred embodiment one or both of the upper and lower surfaces of each end block unit include a fiber guiding channel therein. For example, the upper surface 82 and the lower surface 84 of the end block unit 38 include respective channels 86 and 88 extending in the direction of longitudinal axis 10 between the opposing end surfaces of the end block unit for accommodating respective individual glass fibers. End unit 38' includes similar channels 90 and 92 in its upper and lower surfaces, respectively, as depicted in the drawings.

The splice casing assembly 2 also includes an elongated member 94 having an internal cavity 96 extending therethrough from one extremity 98 to an opposite extremity 100 for housing the elongated support bar 8 and the attachments thereto. Means generally designated 102 is associated with extremity 98 for enclosing the cavity at extremity 98 and securing in place the first length of fiber optic cable 4. Similarly, means 104 is associated with extremity 100 for enclosing the cavity at extremity 100 and securing in place the second length of fiber optic cable 6. Each enclosing and securing means 102 and 104 are identical, and therefore the following discussion is directed to means 104, it being understood that similar structure is provided for means 102.

Each enclosing and securing means 104 depicted in the drawings is known in the art and will not be described in detail except to note that it includes a compression nut 106, a nylon lock nut 108 sized to accommodate the particular cable type, a similarly sized tapered rubber bushing 110, and a coupling 112 which is threaded at both ends thereof. Assembly of the elongated member 94 and enclosing and securing means 102 and 104 is known in the art and will not be discussed herein except to note that each securing means serves to provide a grip on the outer jacket of a respective cable 4, 6 and to contain the inner strain relief parts depicted in FIG. 2 in the housing 94.

Figure 2:
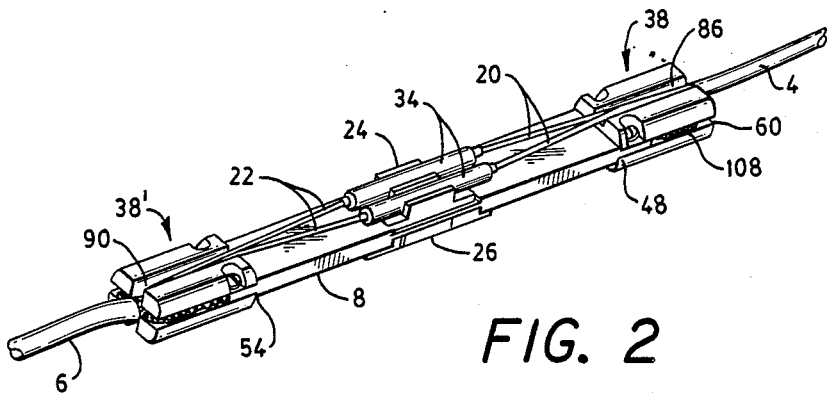
FIG. 2 is a perspective view of the embodiment of FIG. 1 partially assembled including a length of fiber optic cable.
Figure 3:
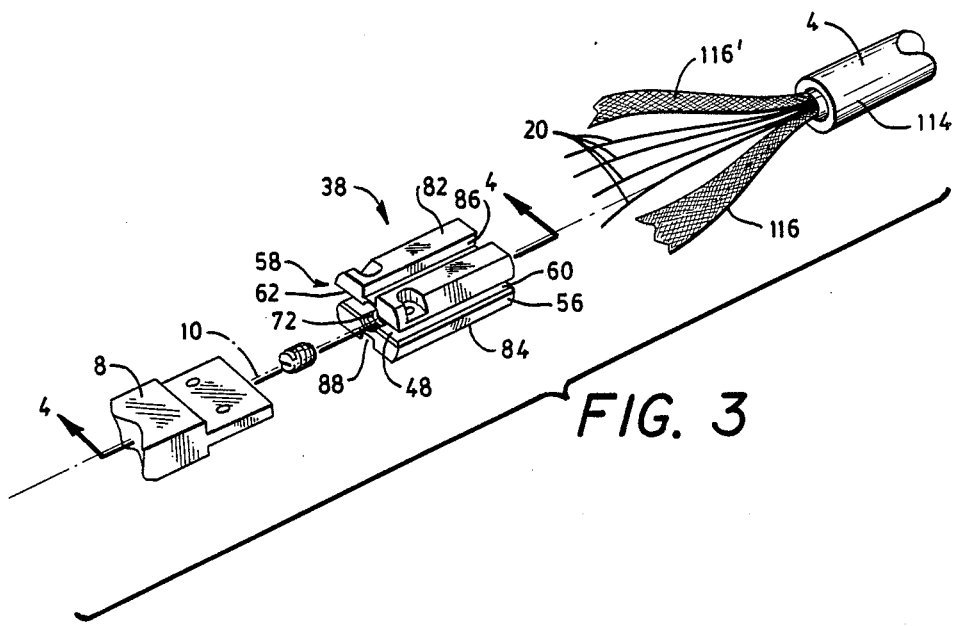
FIG. 3 is an exploded perspective view of one end of the embodiment of FIG. 1 including a length of fiber optic cable.
Figure 4:
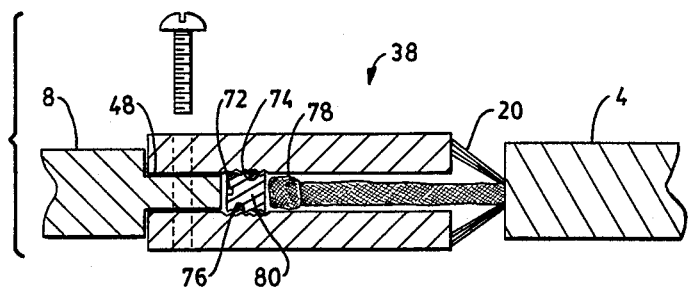
FIG. 4 is an elevational view of one end of the embodiment of FIG. 1 partially assembled including a length of fiber optic cable.

In order to understand the manner in which the splice casing assembly 2 functions, reference is made to FIG. 3. FIG. 3 depicts a typical fiber optic cable 4 which has been inserted through the enclosing and securing means 102 and the elongated member 94, neither of which are shown in FIG. 3. The end of cable 6 has been stripped in a known manner by stripping off several inches of the cable jacket 114. The individual glass fibers 20, which typically are encased in a known cladding, are then separated into two paths. The cable strength members are also separated into two groups 116, 116'. As is known in the art, such strength members are typically formed from kevlar fibers. The two groups of individual glass fibers 20 are then guided as depicted in FIG. 2 along channel 86 to respective splicing devices 34. As depicted in FIG. 2, glass fibers 22 of cable 6 are guided along a similar channel 90 and connected by means of splicing devices 34 to corresponding glass fibers 20 in a known manner. The splicing devices 34 are snapped into place in respective U-shaped recesses 32. Additional glass fibers 20 and 22 can be guided along channels 88 and 92, respectively, and spliced at splicing devices 34'.

Figure 5:
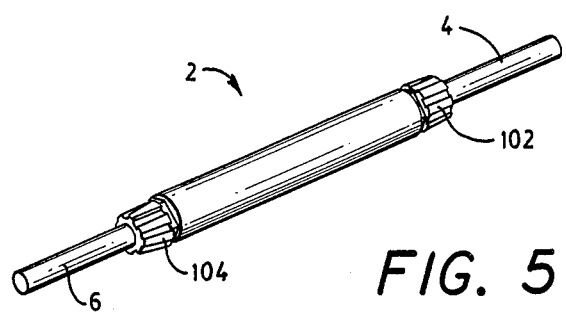
FIG. 5 is a perspective view of the assembled splice casing assembly of the present invention.
Figure 6:
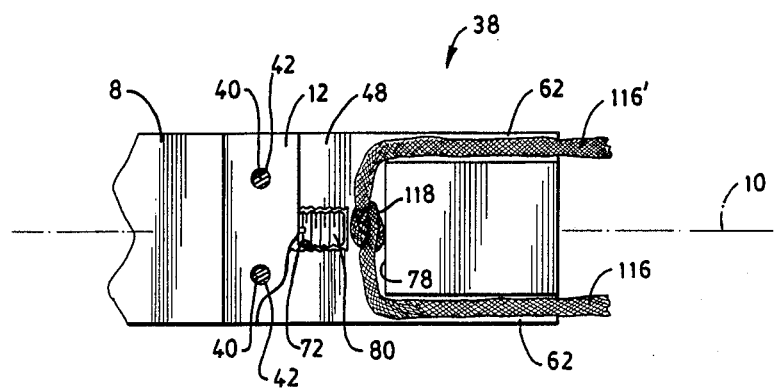
FIG. 6 is a diagramatic representation in plan view and partially in cross section of part of one end of the embodiment of FIG. 2.

Referring to FIG. 6 which is a diagramatic representation of end block 38, a length of cable strength members 116 of fiber optic cable 4 is guided in the direction of axis 10 along groove 60. A similar length of cable strength members 116' is guided in a similar manner along groove 62. In this manner a respective groove receives a respective length of strength members which thereby extend axially relative to the cable; that is, in the direction of axis 10. The two ends of cable strength members 116 and 116' are then tied into a knot 118 such that the knot and a length of each strength member lie in groove 48. Set screw 80 is then threaded into the threaded area 72 thereby sandwiching the cable strength members at the knot 118 between the set screw 80 and the base 78 of groove 48. To secure the cable strength members in place the tongue 12 is then inserted into the groove 48 such that it either contacts set screw 80, or is in close proximity thereto, to prevent the set screw from inadvertently being screwed away from the knot. This procedure is repeated with the strength members of fiber optic cable 6 which are fastened in a similar manner to end block 38'. Subsequently, the elongated member 94 is moved axially relative to fiber optic cable 4 until it completely encloses the elongated support bar 8 attachments thereto. In other words, the structure depicted in FIG. 2 is positioned within cavity 96 of the elongated member 94. Finally, the enclosing and securing means 102 and 104 are fastened to the elongated member 94 to enclose the elongated member 94 at each end and to secure the fiber optic cables 4 and 6, respectively, in place in a known manner. The fully assembled splice casing assembly is depicted in FIG. 5.

It will be apparent that the splice casing assembly described herein achieves the objects of the present invention. For example, the present invention provides a splice casing assembly which can be readily used in the field, provides dependability by assuring that constituent fibers are properly aligned, provides protection of the spliced area from environmental factors, and secures the splice in place. A casing plug or end block is provided around which the strength members and fibers can be guided to provide user friendliness and proper alignment. Such guiding allows for the introduction of a slight excess in fiber length during assembly. The strength members of the fiber optic cable are tied axially relative to the cable and therefore entirely on the line of stress so that the total tensile strength of the cable will be taken advantage of. Further, the individual strands of the strength members are not preferentially stressed. In addition, the fiber and strength members are not forced around sharp corners or positioned in a manner likely to cause fraying of the strength members or microbending of the fibers.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:

1. A splice casing assembly for splicing a first length of fiber optic cable to a second length of fiber optic cable, comprising:
   an elongated support bar extending along a longitudinal axis and having a first tongue extending from a first end and a second tongue extending from an opposite second end;
   means in association with said elongated support bar and positioned between said first end and said opposite second end for splicing together individual glass fibers extending from said first length of fiber optic cable and said second length of fiber optic cable;
   first means coupled to said first end of said elongated support bar for securing in place a length of first strength members of said first length of fiber optic cable, said first means including a first end block extending along said longitudinal axis from a first end block extremity which is adjacent said first end of said elongated support bar to an opposite first end block extremity and comprising a first transverse groove extending in a direction transverse to said longitudinal axis at said first end block extremity, said first tongue fitting into said first transverse groove,
   second means coupled to said second end of said elongated support bar for securing in place a length of second strength members of said second length of fiber optic cable, said second means including a second end block extending along said longitudinal axis from a second end block extremity which is adjacent said second end of said elongated support bar to an opposite second end block extremity and comprising a second transverse groove extending in a direction transverse to said longitudinal axis at said second end block extremity, said second tongue fitting into said second transverse groove;

an elongated member having an internal cavity extending therethrough from one extremity to an opposite extremity for housing said elongated support bar, said first means and said second means;

means associated with said one extremity for enclosing said cavity at said one extremity and securing in place said first length of fiber optic cable; and means associated with said opposite extremity for enclosing said cavity at said opposite extremity and securing in place said second length of fiber optic cable.

2. The splice casing assembly of claim 1 wherein said first end block includes a pair of first opposing side surfaces and a respective first groove extending in the direction of said longitudinal axis along each first side surface of said pair of opposing first side surfaces for receiving respective lengths of said first strength members, and wherein said first transverse groove extends from one of said respective first grooves to another of said respective first grooves, and wherein said second end block includes a pair of second opposing side surfaces and a respective second groove extending in the direction of said longitudinal axis along each second side surface of said pair of opposing second side surfaces for receiving respective lengths of said second strength members, and wherein said second transverse groove extends from one of said respective second grooves to another of said respective second grooves.

3. The splice casing assembly of claim 2 wherein said first end block includes a first internally threaded area extending along said longitudinal axis along opposing walls of said first transverse groove towards a base of said first transverse groove and further includes a first set screw for screwing into said first internally threaded area for sandwiching said length of first strength members between said first set screw and said base of said first transverse groove, and wherein said second end block includes a second internally threaded area extending along said longitudinal axis along opposing walls of said second transverse groove towards a base of said second transverse groove and further includes a second set screw for screwing into said second internally threaded area for sandwiching said length of second strength members between said second set screw and said base of said second transverse groove.

4. The splice casing assembly of claim 3 wherein said splicing means includes at least one splice clip extending outwardly from at least one surface of said elongated support bar and further includes at least one splicing device for splicing together said individual glass fibers, said at least one splicing device being held in place by said at least one splice clip.

5. The splice casing assembly of claim 1 wherein said first end block includes a first internally threaded area extending along said longitudinal axis along opposing walls of said first transverse groove towards a base of said first transverse groove and further includes a first set screw for screwing into said first internally threaded area for sandwiching said length of first strength members between said first set screw and said base of said first transverse groove, and wherein said second end block includes a second internally threaded area extending along said longitudinal axis along opposing walls of said second transverse groove towards a base of said second transverse groove and further includes a second set screw for screwing into said second internally threaded area for sandwiching said length of second strength members between said second set screw and said base of said second transverse groove.

6. The splice casing assembly of claim 1 wherein said splicing means includes at least one splice clip extending outwardly from at least one surface of said elongated support bar and further includes at least one splicing device for splicing together said individual glass fibers, said at least one splicing device being held in place by said at least one splice clip.

7. The splice casing assembly of claim 1 wherein said first end block and said second end block each comprise an upper surface, a lower surface, and a pair of opposing side surfaces and a pair of opposing end surfaces which join together said upper surface and said lower surface, and a respective first groove extending in the direction of said longitudinal axis along each side surface of said pair of opposing side surfaces, and wherein said first transverse groove and said second transverse groove are formed in a respective of said first end block and said second end block by a respective transverse groove extending along an end surface of said pair of opposing end surfaces to connect said respective first grooves.

8. The splice casing assembly of claim 7 wherein one or both of said upper surface and said lower surface include a channel extending in the direction of said longitudinal axis between said pair of opposing end surfaces for accommodating respective individual glass fibers.

9. A spliced fiber optic cable, comprising:

a first length of fiber optic cable and a second length of fiber optic cable;

an elongated support bar extending along a longitudinal axis and having a first tongue extending from a first end and a second tongue extending from an opposite second end;

at least one splicing device splicing individual glass fibers of said first length of fiber optic cable to respective individual glass fibers of said second length of fiber optic cable;

means associated with said elongated support bar and positioned between said first end and said opposite second end for holding said at least one splicing device in place relative to said elongated support bar;

a first member coupled to said first end of said elongated support bar and securing in place a length of first strength members of said first length of fiber optic cable, said first member including a first end block extending along said longitudinal axis from a first end block extremity which is adjacent said first end of said elongated support bar to an opposite first end block extremity and comprising a first transverse groove extending in a direction transverse to said longitudinal axis at said first end block extremity, said first tongue and a first portion of said length of first strength members being fitted into said first transverse groove such that said first portion of said length of first strength members is positioned between said first tongue and a base of said first transverse groove;

a second member coupled to said second end of said elongated support bar and securing in place a length of second strength members of said second length of fiber optic cable, said second member including a second end block extending along said longitudinal axis from a second end block extremity which is adjacent said second end of said elongated support bar to an opposite second end block extremity and comprising a second transverse groove extending in a direction transverse to said longitudinal axis at said second end block extremity, said second tongue and a first portion of said length of second strength members being fitted into said second transverse groove such that said first portion of said length of second strength members is positioned between said second tongue and a base of said second transverse groove;

an elongated member having an internal cavity extending therethrough from one extremity to an opposite extremity, said elongated support bar, said first member and said second member being positioned within said cavity;

means associated with said one extremity for enclosing said cavity at said one extremity and securing in place said first length of fiber optic cable; and means associated with said opposite extremity for enclosing said cavity at said opposite extremity and securing in place said second length of fiber optic cable.

10. The spliced fiber optic cable of claim 9 wherein said first end block includes a pair of first opposing side surfaces and a respective first groove extending in the direction of said longitudinal axis along each first side surface of said pair of opposing first side surfaces, a further portion of said length of first strength members being positioned within a respective first groove, and wherein said first transverse groove extends from one of said respective first grooves to another of said respective first grooves, and wherein said second end block includes a pair of second opposing side surfaces and a respective second groove extending in the direction of said longitudinal axis along each second side surface of said pair of opposing second side surfaces, a further portion of said length of second strength members being positioned within a respective second groove, and wherein said second transverse groove extends from one of said respective second grooves to another of said respective second grooves.

11. The spliced fiber optic cable of claim 10 further including a first internally threaded area extending along said longitudinal axis along opposing walls of said first transverse groove from said first end block extremity towards said base of said first transverse groove, and further including a first set screw screwed into said first internally threaded area and sandwiching said first portion of said length of first strength members between said first set screw and said base of said first transverse groove, and further including a second internally threaded area extending along said longitudinal axis along opposing walls of said second transverse groove from said second end block extremity towards said base of said second transverse groove and further including a second set screw screwed into said second internally threaded area and sandwiching said first portion of said length of second strength members between said second set screw and said base of said second transverse groove.

12. The spliced fiber optic cable of claim 11 wherein said length of first strength members are tied into a first knot which is positioned in said first transverse groove, said first set screw sandwiching said first knot between said first set screw and said base of said first transverse groove, and further wherein said length of second strength members are tied into a second knot which is positioned in said second transverse groove, said second set screw sandwiching said second knot between said second set screw and said base of said second transverse groove.

* * * * *